United States Patent [19]

Hirsch

[11] Patent Number: 5,454,166

[45] Date of Patent: Oct. 3, 1995

[54] DEBURRING TOOL

[75] Inventor: Naftali Hirsch, Nahariya, Israel

[73] Assignee: Noga Engineering Ltd., Israel

[21] Appl. No.: 209,418

[22] Filed: Mar. 9, 1994

[30]     Foreign Application Priority Data

Mar. 12, 1993 [IL] Israel .......................................... 105041

[51] Int. Cl.[6] ................................................. B23D 79/08
[52] U.S. Cl. ................................................. 30/317; 30/169
[58] Field of Search ............................... 30/103, 169, 172,
30/314, 315, 317, 340, 342, 346, 353, 171;
15/236.01, 236.05, 236.06, 236.07, 236.08, 236.09

[56]              References Cited

U.S. PATENT DOCUMENTS

| | | | |
|---|---|---|---|
| 2,759,263 | 8/1956 | Shigley et al. | 30/169 |
| 3,751,804 | 8/1973 | Pulrang | 30/169 |
| 3,789,972 | 1/1974 | Carossino | 30/109 |
| 3,895,439 | 7/1975 | Ehrenberg et al. | 30/171 |
| 4,270,269 | 6/1981 | Weil et al. | 30/123 |
| 4,442,601 | 4/1984 | Hirsch et al. | 30/169 |
| 4,455,747 | 6/1984 | Carossino | 30/172 |
| 4,777,725 | 10/1988 | Hirsch | 30/331 |
| 5,054,201 | 10/1991 | Andrews | 30/172 |

Primary Examiner—Kenneth E. Peterson
Attorney, Agent, or Firm—Brumbaugh, Graves, Donohue & Raymond

[57]                  ABSTRACT

The invention is directed to a deburring tool capable of deburring cylindrical grooves machined into relatively inaccessible areas of metal. The deburring includes a handle, and a scraping blade which is inserted into the handle. The scraping blade has two or more cutting edges which are formed at an angle to each other. The two or more cutting edges are separated from each other. The unique design enables an operator to simultaneously remove burrs from at least two edges of the groove.

10 Claims, 4 Drawing Sheets

5,454,166

DEBURRING TOOL

BRIEF DESCRIPTION OF THE INVENTION

The invention relates to a manual deburring tool. More particularly, the invention concerns a deburring tool suitable for deburring surfaces inaccessible by known deburring tools.

BACKGROUND OF THE INVENTION

Deburring tools utilizing scraping blades have already been know for many years. Such tools are utilized in the manufacturing of metal workpieces by smoothing sharp edges and removing burrs formed between adjacent surfaces.

Known deburring tools have a scraping blade mounted in a handle either directly or through a blade-holder. When such a scraping blade mounted in a handle is brought into contact with a curved sharp edge and rotated in a crank-like motion along the curved edge, a nicely obliqued face is obtained.

Many different blade configurations have been designed for the deburring of sharp edges of various shapes and at various positions on metallic parts as well as other rigid materials. However, some machined positions within workpieces, such as internal cylindrical grooves, are inaccessible with known deburring tools. Internal cylindrical grooves are very common in metal parts primarily for the placement of "O" rings and for hydraulic passages. Edges of internal cylindrical grooves cannot be deburred by known hand tools and the removal of burrs therefrom has to be carried out by special cutting tools mounted on a lathe and subsequently removing the burrs from the grooved edges one edge at a time, by machining them on the lathe. Such an operation is cumbersome, expensive and time-consuming.

It is thus the object of the present invention to provide a simple hand tool for the deburring of internal cylindrical grooves.

SUMMARY OF THE INVENTION

The invention is directed to a deburring tool capable of deburring internal cylindrical grooves. The invention is also directed to a scraper blade adapted to fit into a handle to provide for a deburring tool utilizing scraper blades capable of deburring cylindrical internal grooves.

In accordance with the invention, the deburring tool comprises a handle and a scraping blade. The scraping blade has at least one pair of cutting edges which extend from a cylindrical shank. One cutting edge in the pair is inclined to the other cutting edge in the pair, the cutting edges and shank are substantially coplanar.

The scraping blade of the invention comprises a cylindrical shank insertable into a handle and a cutting blade comprising at least tow cutting edges. The shank comprises three portions to allow for application of a rotational force to swivel the cutting blade; a first portion provided with means to be inserted in the handle; and second portion inclined to the first portion; and a third portion extending from the second portion substantially parallel to the first portion. The cutting blade extending from the third portion is coplanar with the shank.

Preferably, the scraping blade of the invention is rotatably inserted in the handle. When a scraping blade is rotably mounted in a handle and the two cutting edges are brought into contact with sharp edges of an internal cylindrical groove, and rotated in a crank-like motion along the curved edges, nicely obliqued faces are simultaneously obtained. Alternatively, the scraping blade may also be rigidly fixed in the handle.

Preferably, the two cutting edges in paired on the cutting blade are substantially identical and the bisector of the angle between the two cutting edges is substantially perpendicular to the cylindrical shank. However, when the inner diameter of one edge of the cylindrical groove is smaller than the diameter of the other edge, a scraping blade having two non-identical cutting edges with different inclinations to the perpendicular of the cylindrical shank, may be used.

The size and shape of the cutting edges in the scraping blade of the invention may vary according to the width and depth of the groove to be deburred. For shallow grooves, truncated blades are required, whereas for deep grooves, pointed blades may be suitable. Narrow grooves require blades wherein the angle between the two adjacent cutting edges is acute, whereas with wider grooves, the inclination between the cutting edges should be increased.

BRIEF DESCRIPTION OF THE DRAWINGS

The invention is illustrated by way of example, with reference to the enclosed drawings in which.

DETAILED DESCRIPTION OF THE INVENTION

Figure 1:
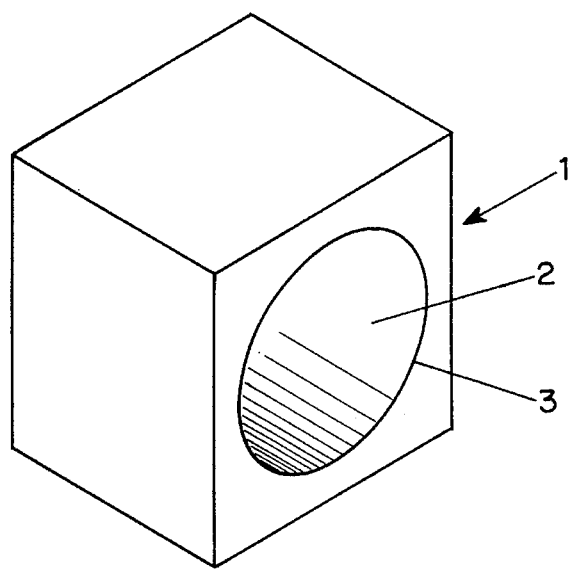
FIG. 1 is a perspective view of a machined steel block.
Figure 2:
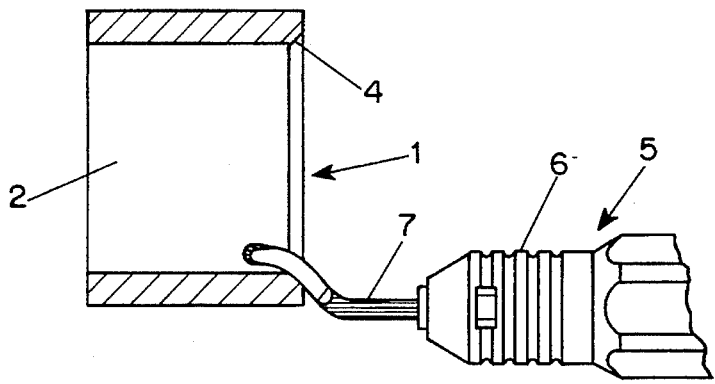
FIG. 2 is a cross-sectional view of the steel block shown in FIG. 1 and a side view of a known deburring tool operating on the steel block shown in FIG. 1.
Figure 3:
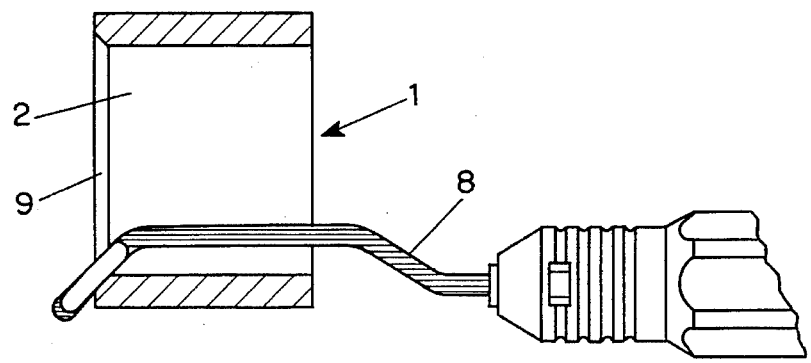
FIG. 3 is a cross-sectional view of the steel block shown in FIG. 1 and a side view of another known deburring tool operating on the steel block shown in FIG. 1.

The machining of a hole 2 in a steel block 1, as shown in FIG. 1, produces round sharp edges 3, one in front of block 1 and the other (not shown in figure) in the back. In FIG. 2, the front edge 3 has been deburred by a known deburring tool 5 comprising a handle 6 (partly shown) and a scraping blade 7, this device produces a nicely chamfered edge 4 by rotating the blade 7 in a crank-like motion around the entire circumference of the front of the hole 2. When the back of the block 1 is attached to another part, and the back end of hole 2 is inaccessible by the deburring tool 5, (shown in FIG. 2) a different scraping blade 8 is inserted in the handle. This scraping blade allows deburring of the back end of hole 2 to produce a nicely chamfered edge 9, as shown in FIG. 3.

Figure 4:
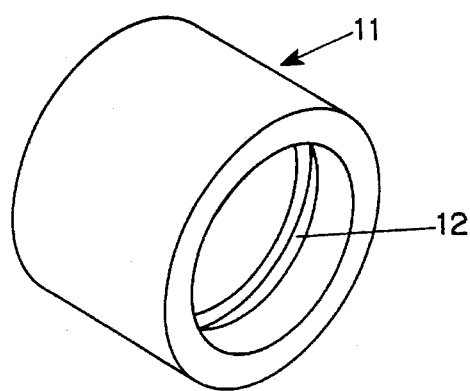
FIG. 4 is a perspective view of a cylinder having an internal cylindrical groove.
Figure 5:
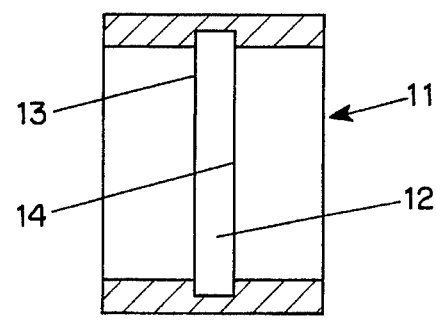
FIG. 5 is a cross-sectional view of a cylinder having an internal cylindrical groove.

The machining of an internal groove 12 in the cylinder 11 shown in FIG. 4, such as for the purpose of the introduction of an "O" ring therein, or to provide for a hydraulic passage, results in the production of two sharp edges 13 and 14, shown in figure 5, which are, inaccessible by known hand deburring tools.

Figure 6:
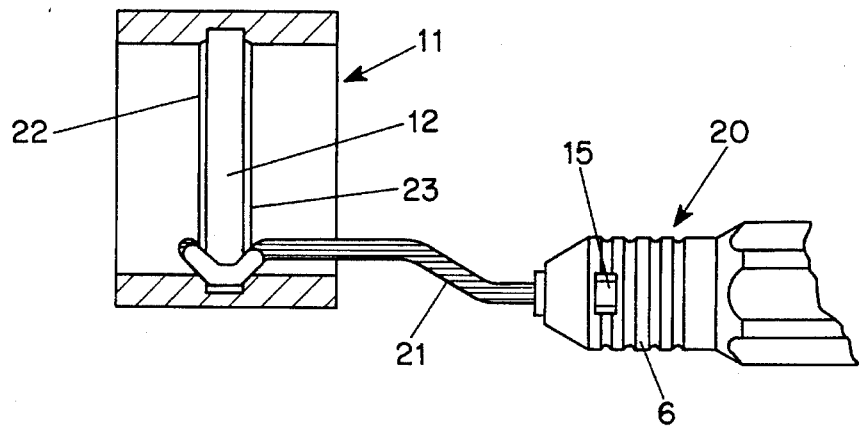
FIG. 6 is a side view of one embodiment of the deburring tool according to the invention operating on the cylindrical groove of FIG. 5.

The deburring tool 20 shown in FIG. 6, comprising a known handle 6 and a novel scraping blade 21, produces chamfered edges 22 and 23 by simultaneous deburring of the two edges 13 and 14 of the groove 12. Similarly, a deburring tool having a novel scraping blade 31, shown in FIG. 7 produces the same simultaneous deburring as shown in FIG. 6.

Figure 7:
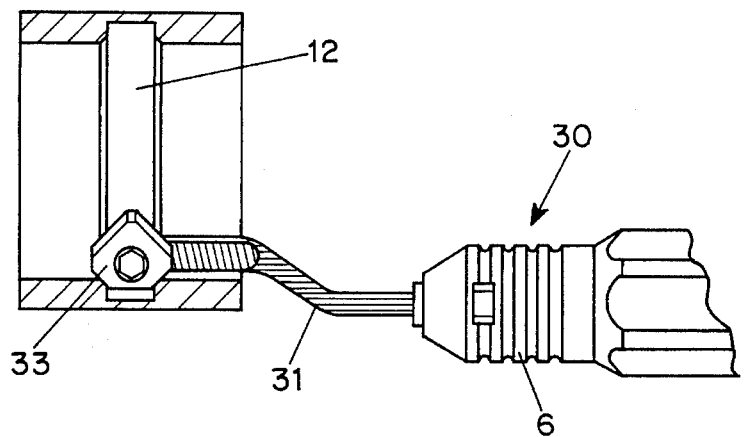
FIG. 7 is a side view of another deburring tool of the invention operating on the cylindrical groove of FIGS. 4 and 5.
Figure 8:
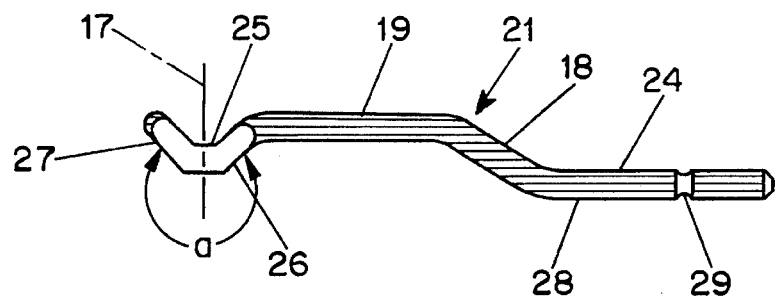
FIG. 8 is a side view of the scraping blade of the deburring tool shown in FIG. 6.

As shown in FIG. 6 and 7, in order for the two edges 13, 14 of the groove 12 to be deburred simultaneously, the two cutting edges (i.e., 26 and 27 as shown in FIG. 8) form an angle with respect to each other of greater than 180°. Since any angle can be defined "internally" or "externally," (e.g. a "right" angle, depending upon one's perspective, is either 90° or 270°), for purposes of clarity, the phrase "the angle formed by the cutting edges of the blade" as used herein shall mean the angle as measured by the arc "a" shown in FIG. 8. This is the angle as measured between the cutting edges in the direction from the cutting edge toward the surface to be deburred. As noted above, for a deburring tool as depicted in FIG. 6 for simultaneously deburring two edges 13, 14 of a groove 12, the angle formed by the cutting edges is greater than 180°.

The novel scraping blade 21, shown in more detail in FIG. 8, comprises a cylindrical shank 24 and a cutting blade 25 having two distinct cutting edges 26 and 27. The shank 24 has three portions: a first portion 28 provided with a circular groove 29, which always for the rotational movement of the scraping blade 21, when inserted in the handle by known means; a second portion 18 inclined to the portion 28; and a third portion 19 which is parallel to the portion 28. As shown in FIG. 8, the cutting blade 25 is attached to the third portion 19. A bisector 17, lying between cutting edges 26 and 27, is perpendicular to the longitudinal axis of the shank 24.

Figure 9:
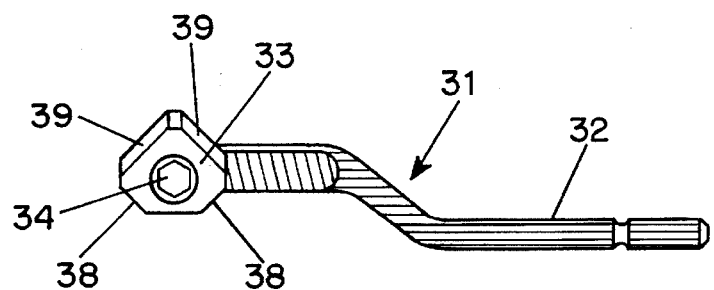
FIG. 9 is a side view of the scraping blade of the deburring tool shown in FIG. 7.

As can be seen in FIG. 6, a knob 15 on the handle 6 provides a locking means which prevents accidental removal of the scraping blade 21 from the handle. When the knob 15 is depressed, the scraping blade 21 may be inserted or removed from the handle. When the knob 15 is released, an internal catch (not shown in figures) snaps into the groove 29, thereby allowing the scraping blade 21 to rotate freely in handle, but preventing longitudinal movement of the blade 21 in the handle. The scraping blade 31 shown in FIGS. 9 and 7 is comprises of detachable parts, i.e., a blade holder 32 configured substantially the same as the shank 24 of FIG. 8 and a detachable cutting blade 33 having two pairs of cutting edges 38 and 39. The cutting blade 33 is attached to the blade holder 32 by known means such as by a screw 34. Unscrewing of the screw 34 allows the cutting blade 33 to rotate and be released from the blade holder 32, thereby allowing a cutting blade of another shape to be introduced on the same blade holder. Alternatively, upon the release of the screw 34, the cutting blade 33 may be turned by 180 degrees and then fixed again to the blade holder 32 to provide for the use of the pair of cutting edges 39 for the deburring of a groove of a different geometry. The pair of cutting edges 39 are adapted to debur deep grooves of a variety of widths, whereas the pair 38 may be used for shallow, wide grooves.

Figure 10:
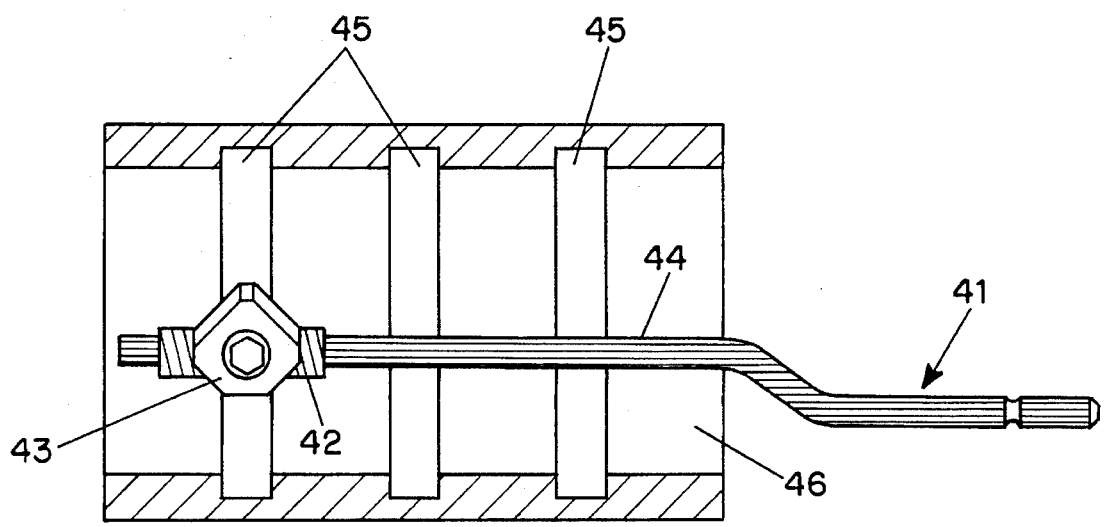
FIG. 10 shows another embodiment of the scraping blade of the invention.

A scraping blade 41, shown in FIG. 10 is provided with a slidable saddle 42, thereby allowing one to fix the cutting blade 43 anywhere along the cylindrical shank 44. Such an arrangement is particularly required when several cylindrical grooves, such as three grooves 45 as shown in FIG. 10, have been machined in the internal surface of a cylinder 46.

Figure 11:
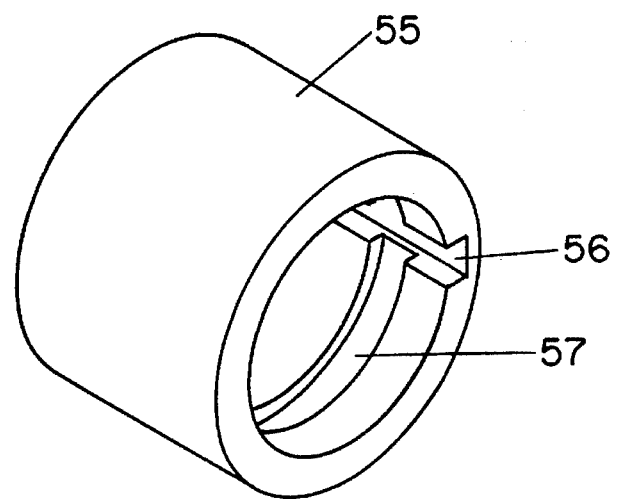
FIG. 11 is a perspective view of a cylinder having an internal cylindrical groove and an internal straight groove.
Figure 12:
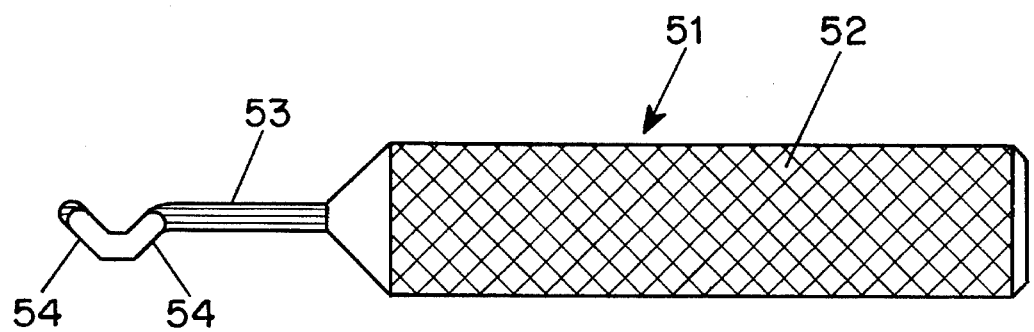
FIG. 12 is a side view of another deburring tool of the invention.

A cylinder 55, shown in FIG. 11, has an internal cylindrical groove 57 and a straight groove 56 perpendicular thereto. Due to the intersection of the grooves 56 and 57, the deburring of the sharp edges of cylindrical groove 57 cannot be carried out with a rotatable deburring tool shown in FIGS. 6 and 7, however a deburring tool 51 shown in FIG. 12 may be used.

The deburring tool 51 comprises a handle 52 and a scraping blade 53 integrally attached thereto. The blade 53, with its two cutting edges 54, is substantially identical to blade 21 shown in FIG. 6.

I claim:

1. A scraping blade for a deburring tool, the deburring tool for removing burrs from an internal groove, comprising:

a cylindrical shank having three sections, a first section having means for being inserted into a handle of the deburring tool, a second section inclined to the first section, and a third section extending from the second section and substantially parallel to the first section; and a cutting blade extending from the third section, the cutting blade, having two or more cutting edges for simultaneously removing burrs from two edges of the groove, said cutting edges forming an angle with respect to each other, the angle formed by the cutting edges of the blade, as measured in the direction form the cutting edge toward the surface to be deburred, while being deburred, being greater than 180°.

2. The scraping blade of claim 1, wherein the cutting blade includes releasable attachment means for securing the cutting blade at a selected location on the third section of the cylindrical shank, the releasable attachment means allowing one to replace the cutting blade.

3. The scraping blade of claim 2, wherein the releasable attachment means includes a sliding means for facilitating the securing of the cutting blade at the selected location on the third section of the cylindrical shank.

4. The scraping blade of claim 3, wherein the sliding means includes a saddle.

5. The scraping blade of claim 1, wherein the two or more cutting edges form an integral part of the cylindrical shank.

6. The scraping blade of claim 1 wherein said two or more cutting edges comprise two cutting edges.

7. The scraping blade of claim 1 wherein said two or more cutting edges comprise four cutting edges.

8. The scraping blade of claim 1, wherein the two or more cutting edges are substantially identical to each other.

9. The scraping blade of claim 1, wherein a bisector of an angle formed by the cutting edges is substantially perpendicular to the longitudinal axis of the cylindrical shank.

10. The scraping blade of claim 1, wherein the first section of the cylindrical shank has an circular groove for securing the blade to the handle and for allowing the blade to rotate relative to the handle.

\* \* \* \* \*

UNITED STATES PATENT AND TRADEMARK OFFICE
CERTIFICATE OF CORRECTION

PATENT NO. : 5,454,166

DATED : October 3, 1995

INVENTOR(S) : Naftali Hirsch

It is certified that error appears in the above-identified patent and that said Letters Patent is hereby corrected as shown below:

On title page, Item [56] references should also include
```
0,109,008    11/1870   Hill....................30/171
0,111,952     2/1871   Locke...................30/171
0,967,480     8/1910   Wright..................30/171
```

Col. 1, line 56, "tow" should read --two--.

Col. 1, line 59, "and second" should read --a second--.

Col. 2, line 5, "in paired" should read --paired--.

Col. 3, line 15, "tool" should read --tool 30--.

Col. 3, line 40, "inclined to the portion 28" should read --inclined to the first portion 28--.

UNITED STATES PATENT AND TRADEMARK OFFICE
CERTIFICATE OF CORRECTION

PATENT NO. : 5,454,166
DATED : October 3, 1995
INVENTOR(S) : Naftali Hirsch

It is certified that error appears in the above-indentified patent and that said Letters Patent is hereby corrected as shown below:

Col. 3, line 41, "parallel to the portion 28" should read --parallel to the first portion 28--.

Col. 3, line 55, "comprises" should read --comprised--.

Col. 4, line 36, "form" should read --from--.

Signed and Sealed this

Thirtieth Day of April, 1996

Attest:

BRUCE LEHMAN

Attesting Officer

Commissioner of Patents and Trademarks